United States Patent Office 2,781,648
Patented Feb. 19, 1957

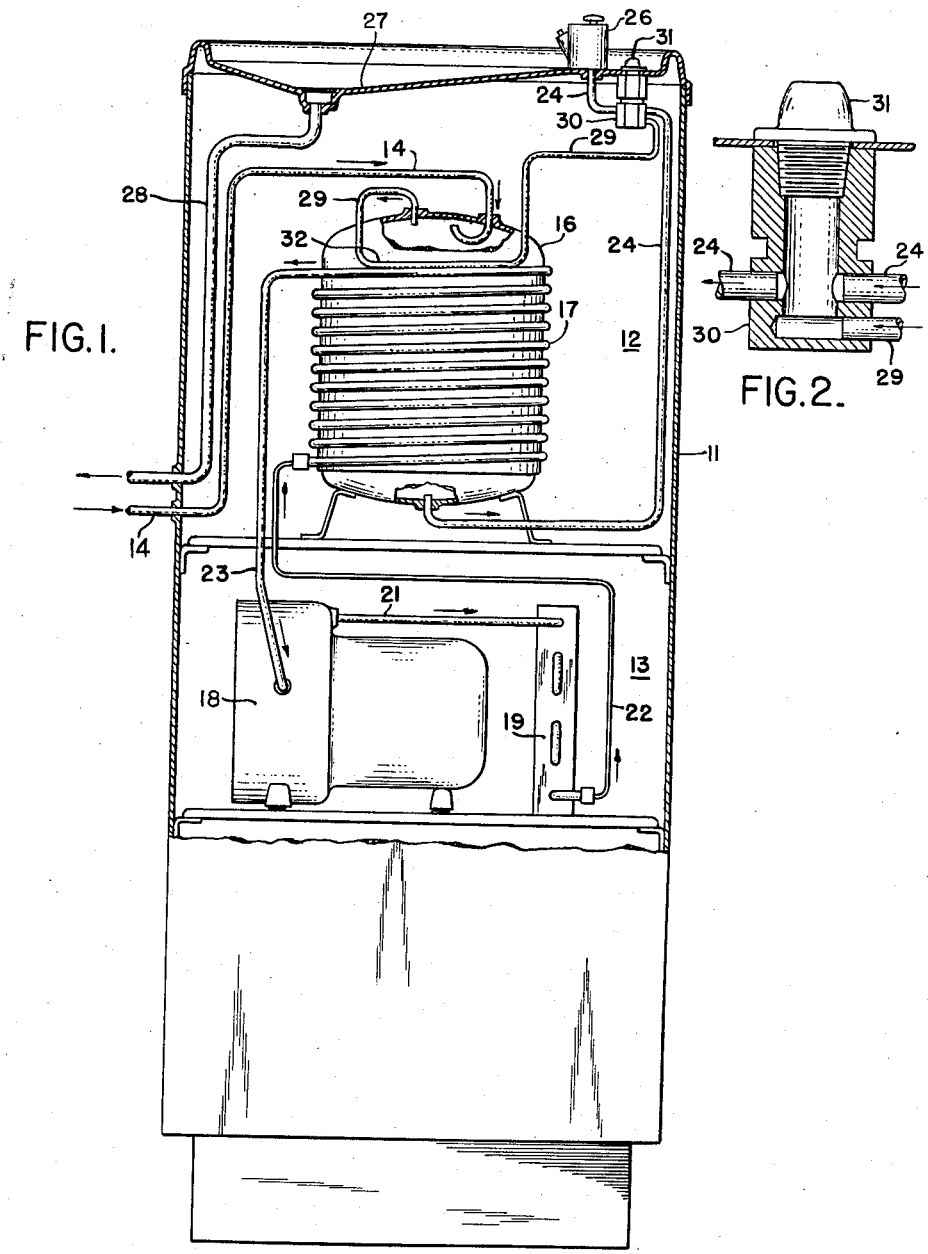

2,781,648

WATER COOLER APPARATUS

Wallace R. Lyman, Springfield, Mass., assignor to Westinghouse Electric Corporation, East Pittsburgh, Pa., a corporation of Pennsylvania Application March 8, 1955, Serial No. 492,863

5 Claims. (Cl. 62—141)

This invention relates to refrigeration apparatus and more particularly to liquid cooling apparatus such as a water cooler.

The invention is especially applicable to refrigerated drinking fountains which receive water from a pressurized supply source, cool the water in a storage tank by means of a mechanical refrigeration system and dispense the cooled water to the consumer through a bubbler or like device. When a cooler of this type is initially placed in service, the air in the storage tank normally cannot be exhausted through the water circuit and becomes trapped in the tank. Moreover, water from city supply systems contains small quantities of entrapped air which is released by the water in a cooler storage tank and becomes trapped therein. Air trapped in a water cooler storage tank prevents the tank from becoming completely filled with water and thereby reduces the amount of water that can be cooled. Most water coolers are, therefore, provided with some means for venting this trapped air from the storage tank.

In some coolers, a small vent or aspirator tube provides communication between the upper portion of the storage tank and the delivery pipe or conduit carrying cooled water from the tank to the bubbler to enable the trapped air to escape into the discharge water stream. The delivery pipe in such coolers is generally restricted in some manner to provide a pressure drop between the tank and the junction with the vent tube to insure that air will be forced through the vent tube. This arrangement for removing trapped air has the disadvantage, however, of reducing the capacity of the cooler to deliver low temperature water and also gives slow air purging. In most coolers the water delivery pipe communicates with the bottom of the storage tank to insure delivery of the coldest water in the tank. The vent tube, on the other hand, must, of necessity, communicate with the top of the storage tank to remove air which is trapped above the water. Once all of the trapped air in the tank escapes through the vent tube and water completely fills the tank, water from the upper region of the tank will begin to flow through the vent tube and into the cooled water delivery pipe. This water in the upper region of the tank is warmer than the cooled water flowing through the delivery pipe and when mixed with the delivery water warms the delivery water a measurable amount.

Attempts have been made to reduce the amount of warm water entering the delivery tube by restricting the flow through the vent tube through the use of a vent tube having a small bore and by means of a restrictive orifice in the vent circuit. Excessive restriction of flow through the vent tube is generally not to be desired because this reduces the rate of removal of air from the storage tank and increases the likelihood of the vent tube becoming blocked with foreign matter often present in the water. There is therefore the requirement, on one hand, for a restricted flow venting system, and on the other hand, for a free flow venting system. In the past these two requirements have been balanced and a partially restricted vent tube selected which falls somewhere between the two extremes. Such an arrangement fails to satisfy either requirement completely.

This invention contemplates venting the storage tank through a vent tube which communicates at one end with the top of the storage tank and at its other end with the cooled water delivery pipe and providing means for refrigerating a section of the vent tube intermediate its ends to cool the fluid, i. e. water or air, flowing therethrough. By cooling any water which flows through the vent tube to substantially the same temperature as the water flowing through the delivery pipe, the tank may be vented into the delivery pipe without raising the temperature of the delivery water. This enables the designer of the cooler to select the proper size vent tube to give the desired venting rate without regard to the effect of mixing the water which escapes through the vent tube with the cooled delivery water. The restriction in the vent circuit may be reduced, or even eliminated. By reducing the restriction in the vent tube the restriction in the water delivery pipe, formerly required to cause air to flow through the restricted vent tube, may also be reduced or eliminated.

The vent tube is refrigerated, preferably, by placing a portion thereof in heat exchange relationship with the refrigerant evaporator or other cooling unit normally associated with the storage tank. One manner in which this may be accomplished will hereinafter be described.

It is, therefore, the principal object of this invention to efficiently vent the storage tank of a water cooler into the water delivery pipe without raising the temperature of the cooled delivery water.

Stated differently, it is the object of this invention to provide an improved venting circuit for the storage tank of a water cooler, which venting circuit does not decrease the capacity of the cooler by permitting warm water to mix with the cooled delivery water.

These and other objects are effected by the invention as will be apparent from the following description taken in connection with the accompanying drawings, forming a part of this application, in which:

Fig. 1 is a partial sectional view of a water cooler embodying this invention, with portions of the water storage tank broken away to show the interior of the tank; and Fig. 2 is an enlarged sectional view of the fitting connecting the vent tube to the water discharge pipe.

In the drawing, the numeral 11 designates generally a free standing fountain type water cooler. As shown, the cooler is divided into an upper water cooling compartment 12 housing the principal components of the water cooling circuit, and a lower refrigeration machinery compartment 13 housing the condensing portion of the refrigerating circuit. Water from a pressurized source enters the cooler through a supply pipe 14, which discharges into the upper portion of a water cooling and storage tank 16.

Water in the storage tank 16 is refrigerated by means of suitable heat exchange apparatus, such as a refrigerant evaporator 17 consisting of refrigerant tubing coiled about the exterior surface of the tank 16. The evaporator 17 is supplied with refrigerant by apparatus located in the refrigeration machinery compartment 13. A conventional compression-expansion type of mechanical refrigeration system is illustrated and consists generally of a motor compressor unit 18 which supplies compressed refrigerant gas to a condenser 19 through a conduit 21. Liquid refrigerant condensed in the condenser 19 passes through a capillary expansion tube 22 into the refrigerant evaporator 17, wherein it vaporizes and absorbs heat from the storage tank 16 and the water contained therein. Vaporous refrigerant from the evaporator 17 is returned to the motor compressor unit 18 through a suction conduit 23 for recirculation.

Cool water refrigerated in tank 16 settles to the bottom of the tank and passes therefrom through a delivery pipe 24 to a valved bubbler 26 mounted on a catch basin 27 atop the cooler 11. Waste water from the bubbler 26 falls into the catch basin 27 and is carried away by a drain pipe 28.

Air in the water storage tank 16 which is present therein when the cooler is initially placed in service and which is subsequently carried in with the supply water cannot escape through the water delivery pipe 24 connected into the bottom of tank 16 and is trapped in the upper portion of the tank. This air must be removed to permit the tank to fill completely with water for efficient utilization of the tank, and a vent tube 29 is provided for this purpose. The vent tube 29 communicates at one end with the top of the storage tank 16 and at its other end with the cooled water delivery pipe 24 through a fitting 30 in the delivery pipe. The fitting 30 may be provided with a cap or plug 31, shown more clearly in Fig. 2, to permit access to its interior for cleaning. This vent tube 29 provides an escape path for the air trapped in the upper portion of the tank 16 and discharges this air into the cool water delivery pipe 24 where it is carried out with the dispensed drinking water. Since the function of the vent tube 29 is to carry air rather than liquid, it may be considerably smaller in cross sectional area than the water carrying pipes of the cooling system.

When all entrapped air has escaped from the storage tank 16 and the tank 16 completely fills with water, some of this water flows through the vent tube 29. Since the vent tube 29 communicates with the upper portion of the storage tank 16, the water that flows through the vent tube 29, coming from the upper region of the tank 16, is appreciably warmer than the cool water flowing from the bottom of the tank and through the delivery pipe 24. In prior coolers this warmer water was permitted to flow through vent tube 29 directly into the delivery water, thereby raising the temperature of the drinking water dispensed. In accordance with this invention, the vent tube 29 has a portion thereof, indicated at 32, in heat exchange relationship with a portion of the evaporator coil 17. The heat exchange portion 32 of vent tube 29 is preferably in direct contact with the portion of the evaporator 17 and may be bonded thereto as by soldering or brazing. With this arrangement, any water flowing through the vent tube 29 will be cooled in the heat exchange portion 32 of the tube before it passes into and mixes with the cooled water flowing in delivery pipe 24. No rise in the temperature of the delivery water takes place and the capacity of the cooler to deliver low temperature water is thereby unimpaired.

From the foregoing, it will be apparent that this invention provides an improved arrangement for venting the water storage tank of a water cooler wherein the air is admitted into the discharge water stream and in which provision is made for preventing the warming of the cooled discharge water by water flowing through the vent tube.

While the invention has been shown in but one form, it will be obvious to those skilled in the art that it is not so limited, but is susceptible of various changes and modifications without departing from the spirit thereof.

What is claimed is:

1. In liquid cooling apparatus, the combination of a tank adapted to contain liquid to be cooled, a liquid supply pipe communicating with said tank, a liquid delivery pipe communicating with the lower portion of said tank, a refrigerant heat exchanger associated with said tank for cooling the contents thereof, and an air purge tube having one end thereof in communication with the top of said tank and the other end thereof in communication with said delivery pipe, said purge tube having a portion thereof in engagement with said refrigerant heat exchanger for cooling the fluid flowing therethrough.

2. In a water cooler, a supply pipe connected to a source of liquid under pressure, a tank supplied by said supply pipe, a liquid delivery pipe communicating with the lower portion of said tank, means including a refrigerant evaporator for cooling the contents of said tank, and an air purge tube having one end in communication with the top of said tank and the other end in communication with said delivery pipe, said purge tube having a portion thereof in engagement with said evaporator to cool the fluid flowing through the tube.

3. A liquid cooling system comprising a supply pipe connected to a source of liquid under pressure, a tank supplied by said supply pipe, a liquid delivery pipe communicating with a lower region of said tank, a refrigerant coil engaging a wall of said tank for cooling the contents of the tank, and an air purge tube connecting an upper region of said tank with said delivery pipe, said purge tube having a portion thereof in engagement with a portion of said refrigerant coil to cool the fluid flowing through the tube.

4. A liquid cooling system as defined by claim 3 in which said portion of said vent tube is bonded to a portion of said refrigerant coil.

5. A liquid cooling system comprising a supply pipe connected to a source of liquid under pressure, a tank supplied by said supply pipe, a liquid delivery pipe communicating with a lower region of said tank, an air purge tube connecting an upper region of said tank with said delivery pipe, and means for refrigerating said tank and said purge tube, said refrigerating means having a portion thereof in engagement with a portion of said tube.

References Cited in the file of this patent

UNITED STATES PATENTS 2,063,002   Smith _____ Dec. 1, 1936